United States Patent
Lewis

(10) Patent No.: US 9,755,549 B2
(45) Date of Patent: Sep. 5, 2017

(54) THREE LEVEL NEUTRAL POINT CLAMPED CONVERTER WITH IMPROVED VOLTAGE BALANCING

(71) Applicant: Raytheon Company, Waltham, MA (US)

(72) Inventor: David C. Lewis, Waltham, MA (US)

(73) Assignee: Raytheon Company, Waltham, MA (US)

( * ) Notice: Subject to any disclaimer, the term of this patent is extended or adjusted under 35 U.S.C. 154(b) by 99 days.

(21) Appl. No.: 15/010,277

(22) Filed: Jan. 29, 2016

(65) Prior Publication Data
US 2017/0222574 A1    Aug. 3, 2017

(51) Int. Cl.
| | | |
|---|---|---|
| H02M 7/44 | (2006.01) | |
| H02M 7/5387 | (2007.01) | |
| H02M 1/08 | (2006.01) | |
| H02M 1/00 | (2006.01) | |

(52) U.S. Cl.
CPC ......... H02M 7/53871 (2013.01); H02M 1/08 (2013.01); *H02M 2001/0009* (2013.01)

(58) Field of Classification Search
CPC ............ H02M 7/10; H02M 7/19; H02M 7/25; H02M 7/42; H02M 7/487
See application file for complete search history.

(56) References Cited

U.S. PATENT DOCUMENTS

| | | | | |
|---|---|---|---|---|
| 6,337,804 B1* | 1/2002 | Kea | ....................... | H02M 7/487 363/132 |
| 2015/0303826 A1* | 10/2015 | Arnedo | ................. | H02M 7/537 363/97 |

OTHER PUBLICATIONS

Sveinung Floten and Tor Stian Haug; "Modulation Methods for Neutral-Point-Clamped Three-Level Inverter"; Norwegian University of Science and Technology; Department of Electric Power Engineering; Jun. 2010.

* cited by examiner

*Primary Examiner* — Adolf Berhane
*Assistant Examiner* — Afework Demisse
(74) *Attorney, Agent, or Firm* — Burns & Levinson LLP; Joseph M. Maraia

(57) ABSTRACT

An NPC converter is controlled by estimating current flow during the short vector periods of a space vector modulation drive signal. The current estimation is used to close a first order inner current regulator loop that steers current to either the upper capacitor or the lower capacitor of a DC link. An outer voltage regulator measures the voltage imbalance across the capacitors and drives the inner current loop. By managing the associated duty cycle of each vector a bias current is formed that balances the capacitor voltages.

18 Claims, 8 Drawing Sheets

THREE LEVEL NEUTRAL POINT CLAMPED CONVERTER WITH IMPROVED VOLTAGE BALANCING

BACKGROUND OF THE INVENTION

Multilevel converters are considered to be a good choice for medium- and high-voltage applications. Prior to the use of multilevel converters, semiconductors needed to be connected in series in order to withstand the high voltages experienced during operation. This series configuration, however, required fast switching to avoid unequal voltage sharing among the devices, which could lead to a breakdown. Multilevel converters, however, have the advantage of clamping the voltages, which prevents the need for fast switching while also providing a smoother output voltage.

A neutral point clamped (NPC) multilevel converter, typically with three (3) levels, can be used to convert a DC signal to an AC signal or to convert an AC signal to a DC signal. One of the challenges with the NPC three-level converter is that of neutral point (NP) voltage balancing. As is known, the correct operation of an NPC converter requires that the voltages across the respective DC capacitors be the same in order to equally distribute the voltage stress, uniformly spread switching losses and improve reliability.

Existing NP voltage balancing techniques that are based on common mode voltage injection result in uneven thermal stress among different power semiconductor devices within the NPC converter. Overcoming these thermal stresses requires overrating the semiconductor devices and/or limiting the operating range of the converter in order to stay within the thermal constraints of all devices.

Other approaches to voltage balancing include carrier offset or bias injection techniques or modifying short vector duration as a direct function of voltage measurement. Further, typical solutions employ a non-space vector modulation technique with PWM overlap. These techniques evaluate harmonics to set the redundant short vector ratio, however, the resulting solutions are computationally complex.

What is needed is an approach to operating an NPC converter with improved voltage balance control.

BRIEF SUMMARY OF THE INVENTION

Generally, embodiments of the present invention add an additional current regulator that controls a balancing current and an additional voltage regulator that controls the differential voltage across the two halves of the DC Link.

In one embodiment, a converter includes a neutral point clamped (NPC) converter module comprising a plurality of phase legs with each phase leg comprising a plurality of switches coupled in series with one another between a first node and a second node and each phase leg further comprising an AC node positioned between two adjacent switches. A current sensor is coupled to each AC node and configured to measure an amount of current flowing into, or out of, each respective AC node and a controller is coupled to the NPC converter module and the current sensor. The controller is configured to: generate a space vector pulse width modulated (SVPWM) signal to control a respective on/off condition of each of the plurality of switches as a function of a short vector current signal generated as a function of a value of the current sensed at the respective AC nodes during short vector periods of the SVPWM signal; and a respective voltage differential between a first voltage on the first node and a second voltage on the second node, each with respect to a third node.

In another embodiment, a method of operating a multilevel neutral point clamped converter comprises measuring AC current flowing in the converter; generating a short vector current signal representing a component of the measured AC current during a short vector period of a space vector pulse width modulated (SVPWM) driving signal; measuring a voltage difference between respective voltages on each of two capacitors in a DC link portion of the converter; and modifying the SVPWM driving signal as a function of the generated short vector current signal and the measured voltage difference.

BRIEF DESCRIPTION OF THE DRAWINGS

Various aspects of at least one embodiment of the present invention are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention. In the figures.

DETAILED DESCRIPTION

Figure 1:
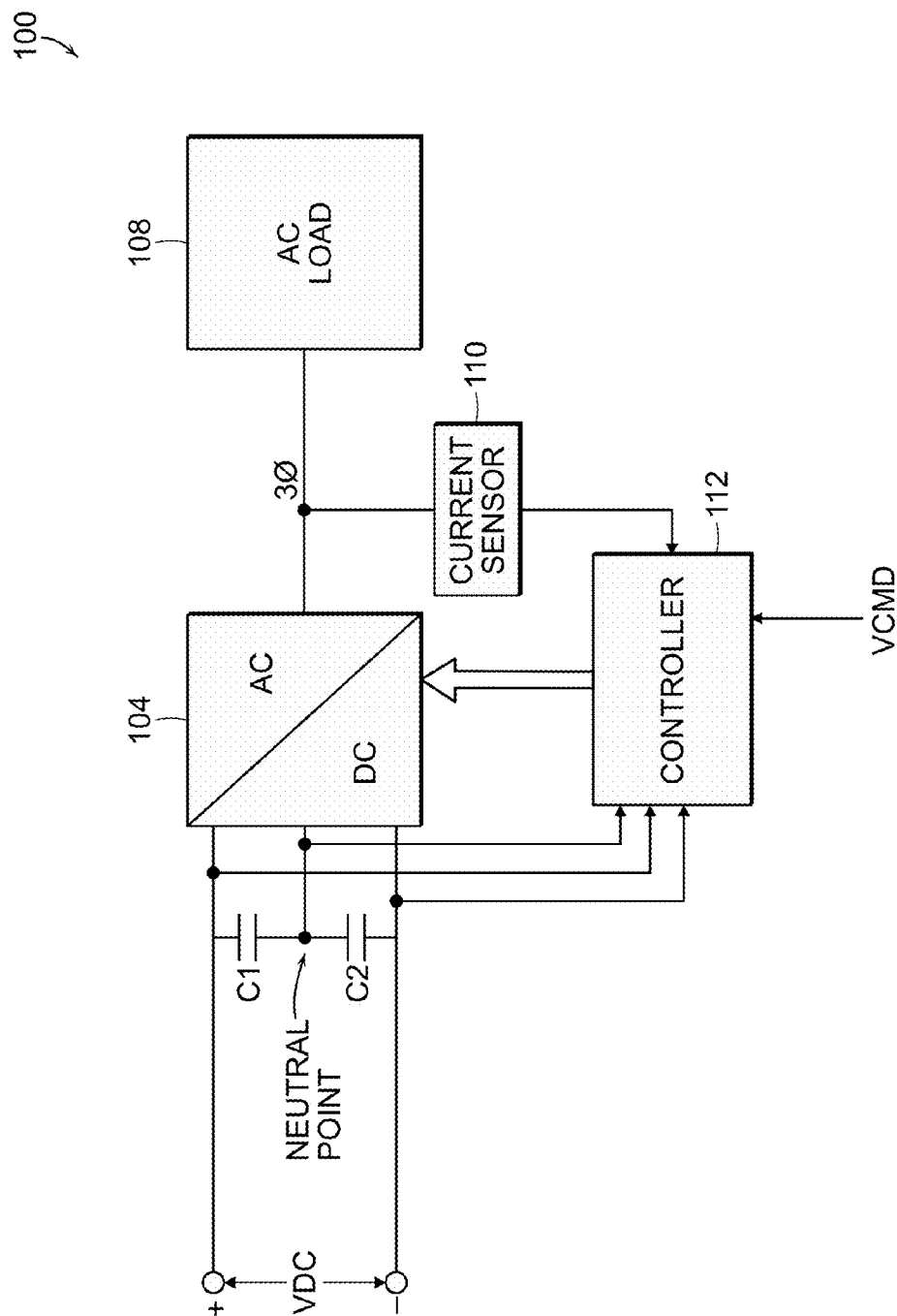
FIG. 1 is a functional block diagram of an NPC multilevel converter system.

In the following detailed description, numerous specific details are set forth in order to provide a thorough understanding of the embodiments of the present invention. It will be understood by those of ordinary skill in the art that these embodiments of the present invention may be practiced without some of these specific details. In other instances, well-known methods, procedures, components and structures may not have been described in detail so as not to obscure the embodiments of the present invention.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description only and should not be regarded as limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Referring now to FIG. 1, an NPC multilevel converter system 100 includes an NPC converter module 104, an AC module 108, a current sensor 110 and a controller 112. In an inverting mode of operation, an input DC signal VDC is converted to a three-phase AC signal and in another mode of operation a three-phase AC signal is converted to an output DC voltage VDC. Two capacitors C1, C2 are connected in series across the DC signal VDC, with a capacitor junction between them referred to as the neutral point (NP). As is known, the controller 112 monitors the current, via current sensor 110, in each AC leg, as well as the voltages across each of the capacitors C1, C2 to control semiconductor switches within the NPC converter module 104.

Figure 2:
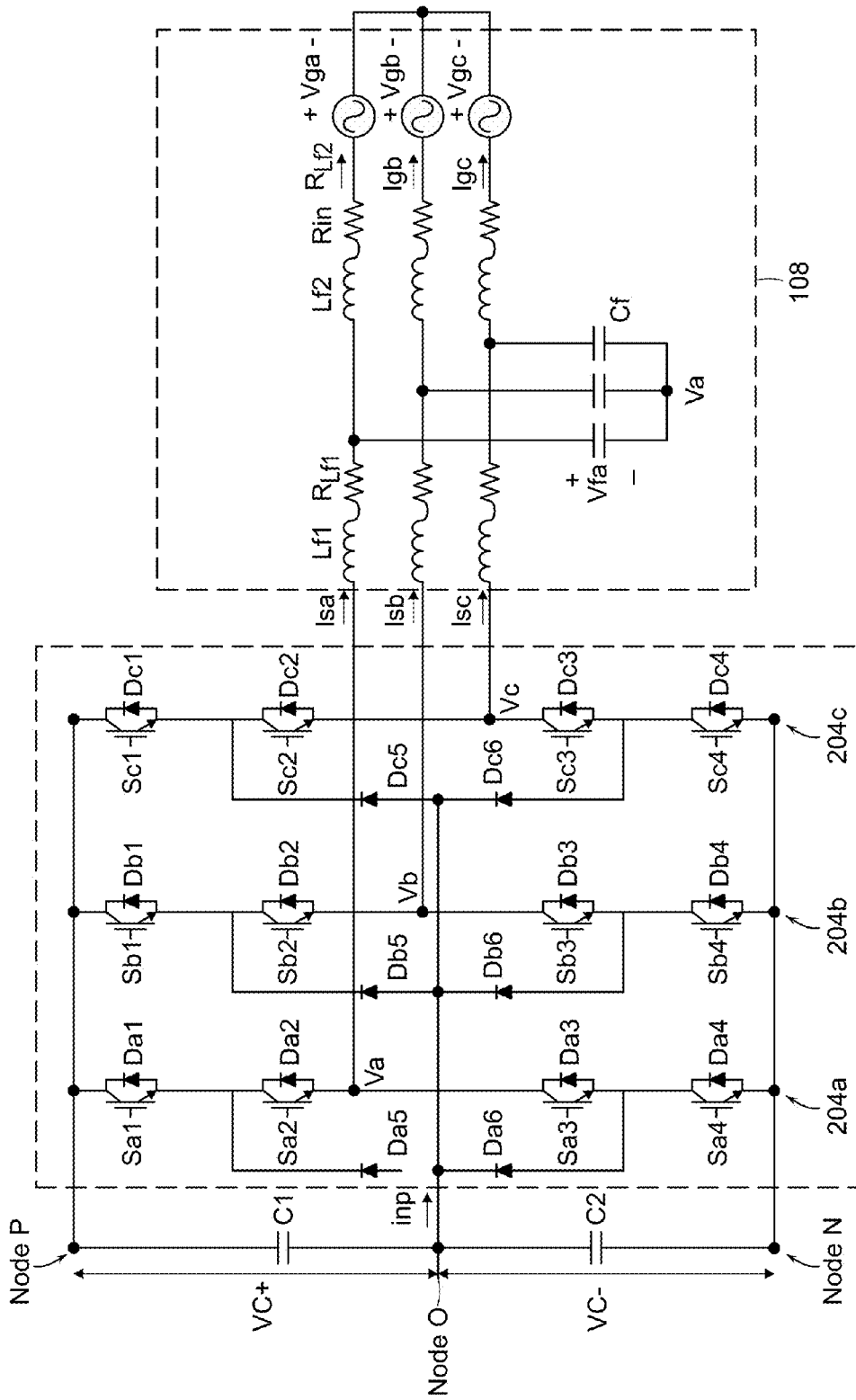
FIG. 2 is a schematic diagram of a portion of the NPC multilevel converter system of FIG. 1.

The AC module 108, as shown in FIG. 2, may include inductors, resistors and capacitors as needed to provide for signal smoothing to the AC signals, all as known to one of ordinary skill in the art.

The converter module 104, referring to FIG. 2, is an NPC three phase, three level converter. The converter 104 receives a single phase AC signal at each of AC node Va, Vb and Vc of each leg 204a, 204b, 204c, respectively. As is known in the art, switches Sxn are controlled by the controller 112 to generate the DC voltage, for example, switches Sa1, Sa2, Sa3, Sa4 in leg 204a. Each leg 204 includes clamping neutral diodes, Dxn, to clamp the leg output to the neutral point NP. The switches Sxn may be transistors as known in the art. As shown in FIG. 2, as the capacitors are of the same size, a node P is at VC+, a node N is at VC− and the node O is at 0 (zero). As VC+ is equal to VC−, the voltage across the two capacitors is 2*|VC+|.

In operation, for example, in leg 204a, when switches Sa1, Sa2 are turned on and Sa3, Sa4 are off, the Va node is coupled to VC+. When Sa1 and Sa4 are off and Sa2 and Sa3 are on, then the Va node is coupled to the mid-point, e.g., ground or neutral. Finally, when Sa1 and Sa2 are off and Sa3 and Sa4 are on, then the Va node is coupled to VC−. The controller 112 generates PWM signals to control the on/off condition of the switches Sxn over time as a function of the voltage across the capacitors C1, C2 and the current at each AC node.

Figure 3:
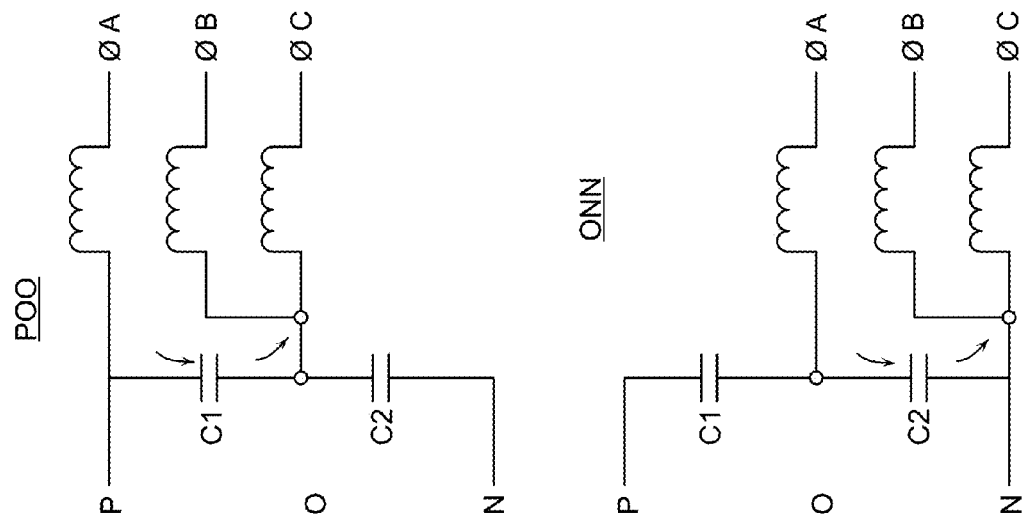
FIG. 3 is a space vector diagram of the possible outputs from an NPC converter.
Figure 3:
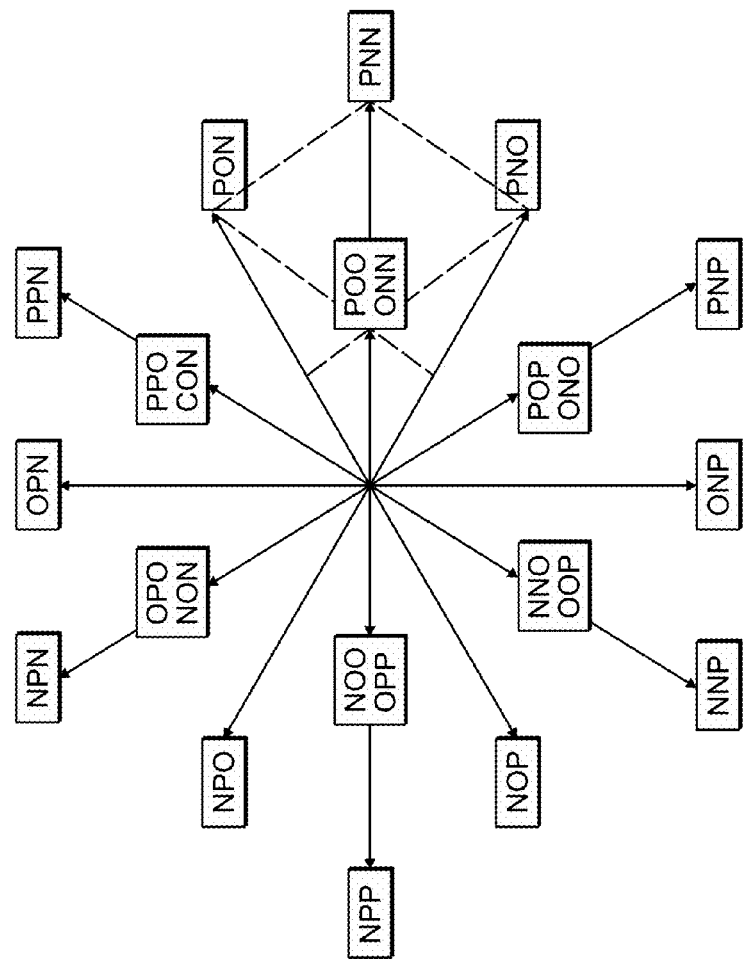

The different states of the bridge legs can be represented, or plotted, in the space vector plot diagram shown in FIG. 3. For example, a space vector POO represents that bridge leg 204a is coupling AC phase A (ϕA) to the positive side of the DC Link, Node P, while bridge leg 204b is coupling AC phase B (ϕB) to neutral node of the DC Link, Node O and bridge leg 204c is also coupling AC phase C (ϕC) to the neutral node of the DC Link Node O. As a result of the POO configuration, current flows through the upper capacitor C1.

Similarly, a space vector ONN represents that bridge leg 204a is coupling AC phase A (ϕA) to the neutral node of the DC Link, Node O, while bridge leg 204b is coupling AC phase B (ϕB) to the negative node of the DC Link, Node N and bridge leg 204c is also coupling AC phase C (ϕC) to) to the negative node of the DC Link, Node N. As a result of the ONN configuration, current flows through the lower capacitor C2. It can be seen that, when viewed from a line to line perspective, the two configurations, POO and ONN, are equivalent to each other. Further, as known by those of ordinary skill in the art, some of the switching states provide the same space vector, for example, the vectors POO, ONN which are referred to as "short vectors." There are a total of six redundant vectors in the space vector plane as shown in FIG. 3. In addition, as also known to those of ordinary skill, there are "medium vectors" such as PON and "long vectors" such as PNN. The space vector modulation cycle is comprised of a scaled combination of a large vector, a medium vector and a short vector.

It was recognized that the large vectors, for example, PNN, straddle both of the DC link capacitors and therefore cannot be used for balancing. Likewise, the medium vectors, e.g., PNO, also straddle both capacitors and, therefore, cannot be used for balancing. Advantageously, in the present invention, the short vectors that can be realized two different ways, e.g., POO or ONN, are used to steer current into the desired capacitor to control the voltage balance.

More specifically, a three level neutral point converter realizes the short vector portion of the modulation in two distinct forms: one utilizing the upper capacitor voltage and one utilizing the lower capacitor voltage. By managing the associated duty cycle of each vector, a bias current is formed that balances the capacitor voltages. Advantageously, embodiments of the present invention allow for a linear voltage balancing regulator to be introduced into a control system.

Figure 4:
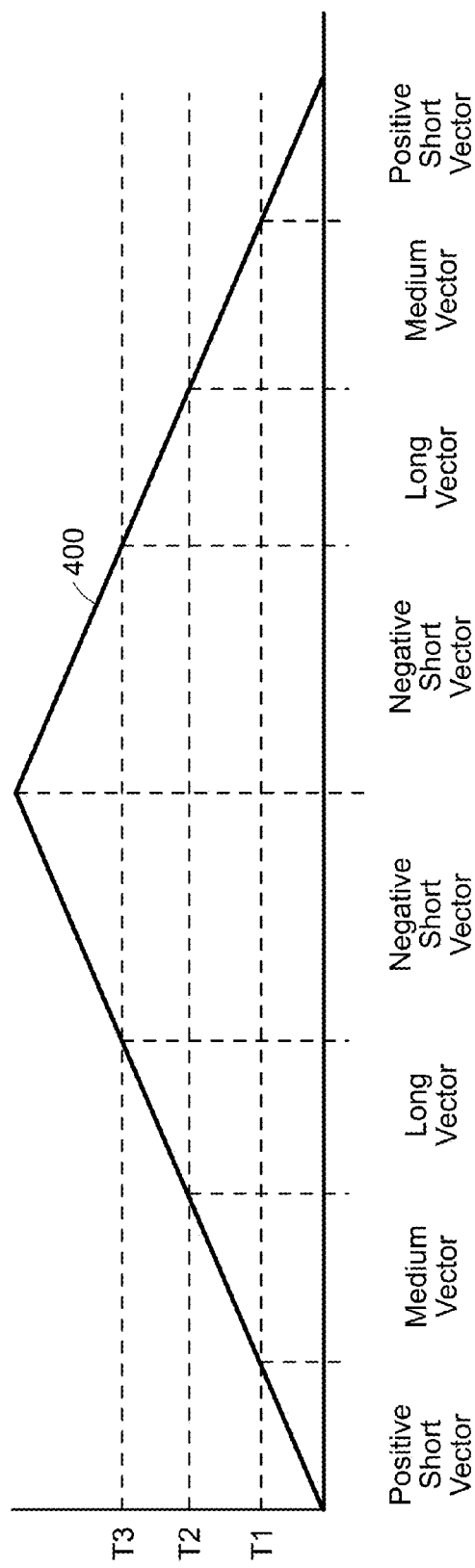
FIG. 4 is a PWM waveform in accordance with one embodiment of the present invention.

In one embodiment of the present invention, the pulse width modulation (PWM) strategy starts and ends each modulation cycle with a positive short vector portion and includes two negative short vector portions of equal duration in the middle of the PWM cycle. Such a PWM strategy is shown in FIG. 4 using a modulation signal 400. The three threshold levels T1, T2, T3 determine the duration of the short, medium and long vectors. The periods of time between T1, T2 and T3 transitions establish the dwell times of the respective medium and long vectors although the order changes depending on the angular location, as shown in FIG. 3. The region below T1 establishes the positive short vector while the region above T3 establishes the negative short vector. It can be readily seen that by adding or subtracting a fixed amount ΔT to each threshold T1+ ΔT, T2+ ΔT and T3+ ΔT that the difference between T1 and T2 along with the difference between T2 and T3 remain unchanged while the balance between the positive short vector and the negative short vector is shifted by ΔT.

Embodiments of the present invention provide a closed loop "balancing current" regulator that actively controls the current flow into the desired capacitor. As described below, this regulator operates as a function of a current command, that is generated by the voltage regulator, and a balancing current feedback, that is generated by a short vector current estimator that extracts a differential current flowing into the neutral point of the capacitors during the short vector period.

As a result, when a duration of the short vectors is equal, an equal amount of current (Amp-sec) is delivered to each capacitor and the short vector current estimator will indicate a current estimate of zero, i.e., they are equal. However, if the short vector balance is established by the current regulator to, for example, 90% positive short vector (POO) and 10% negative short vector (ONN) then the short vector current estimator will indicate that the majority of the current is flowing into the upper capacitor.

Embodiments of the present invention leverage the observation that a converter "DC current" is the dot product of the "AC current vector" and the "space vector." Further, using superposition it follows, therefore, that the "DC current" associated with the short vectors is also the dot product of the "AC current vector" and the "Short Space Vector." This realization forms the basis for extracting the current flow during the short vector period to provide the feedback for a closed loop current regulator. Having an inner current loop allows for an outer voltage loop to manage the current flows with a tunable closed loop control system.

Generally, in a known implementation of an NPC converter, the three phase currents are controlled by managing the amplitude and phase of the space vector. Known control techniques incorporate a two axis current regulator, usually in the synchronous reference frame, i.e., the DQ axis or DQ reference frame, for this purpose.

Embodiments of the present embodiment implement a third axis, i.e., the Z-axis, current regulator for the purpose of regulating the differential current flowing during the short vector periods of the space vector modulation. This additional current regulator provides closed loop control of the voltage balancing of the two capacitors.

Figure 5:
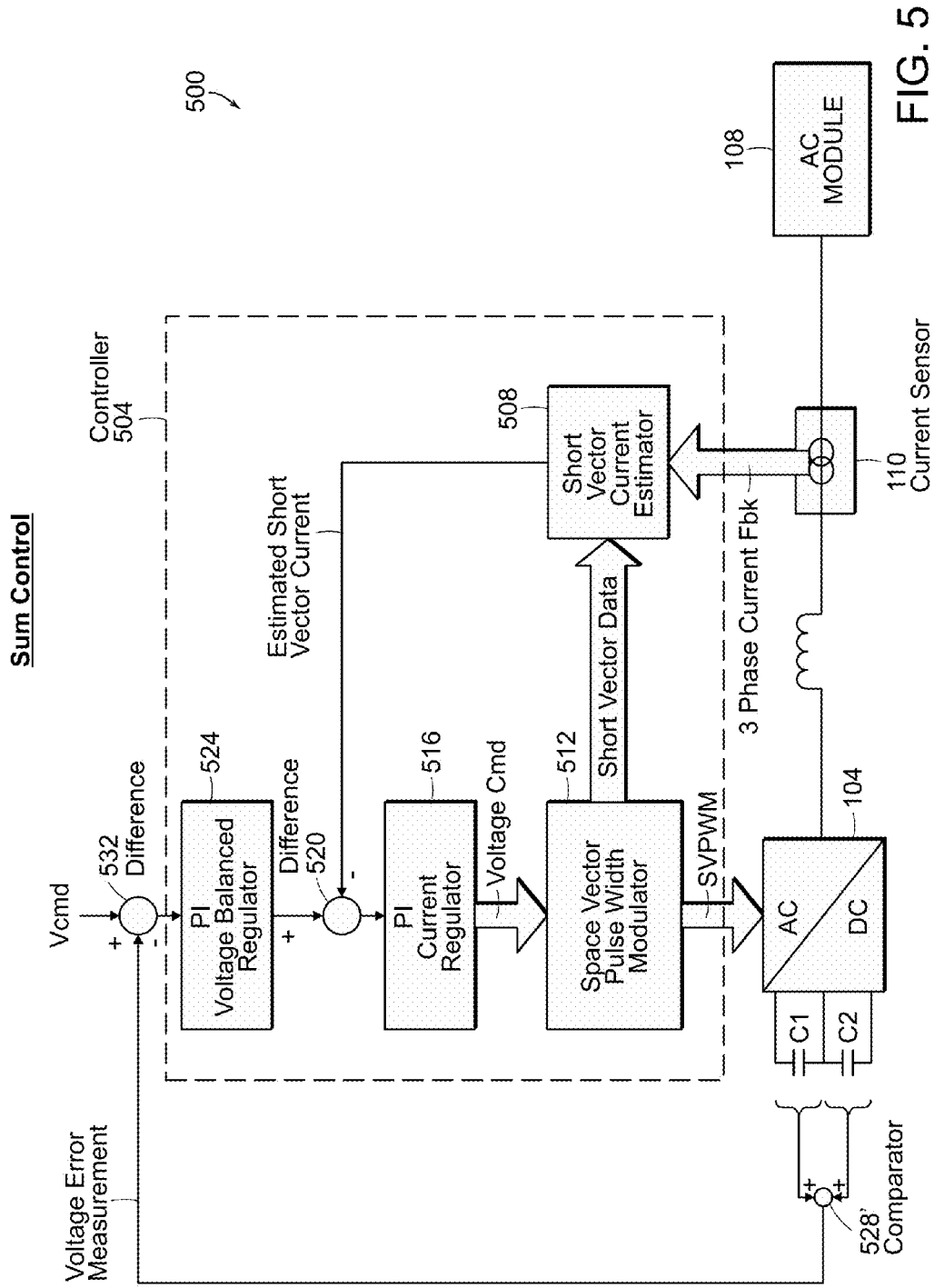
FIG. 5 is functional block diagram of one embodiment of the present invention.
Figure 6:
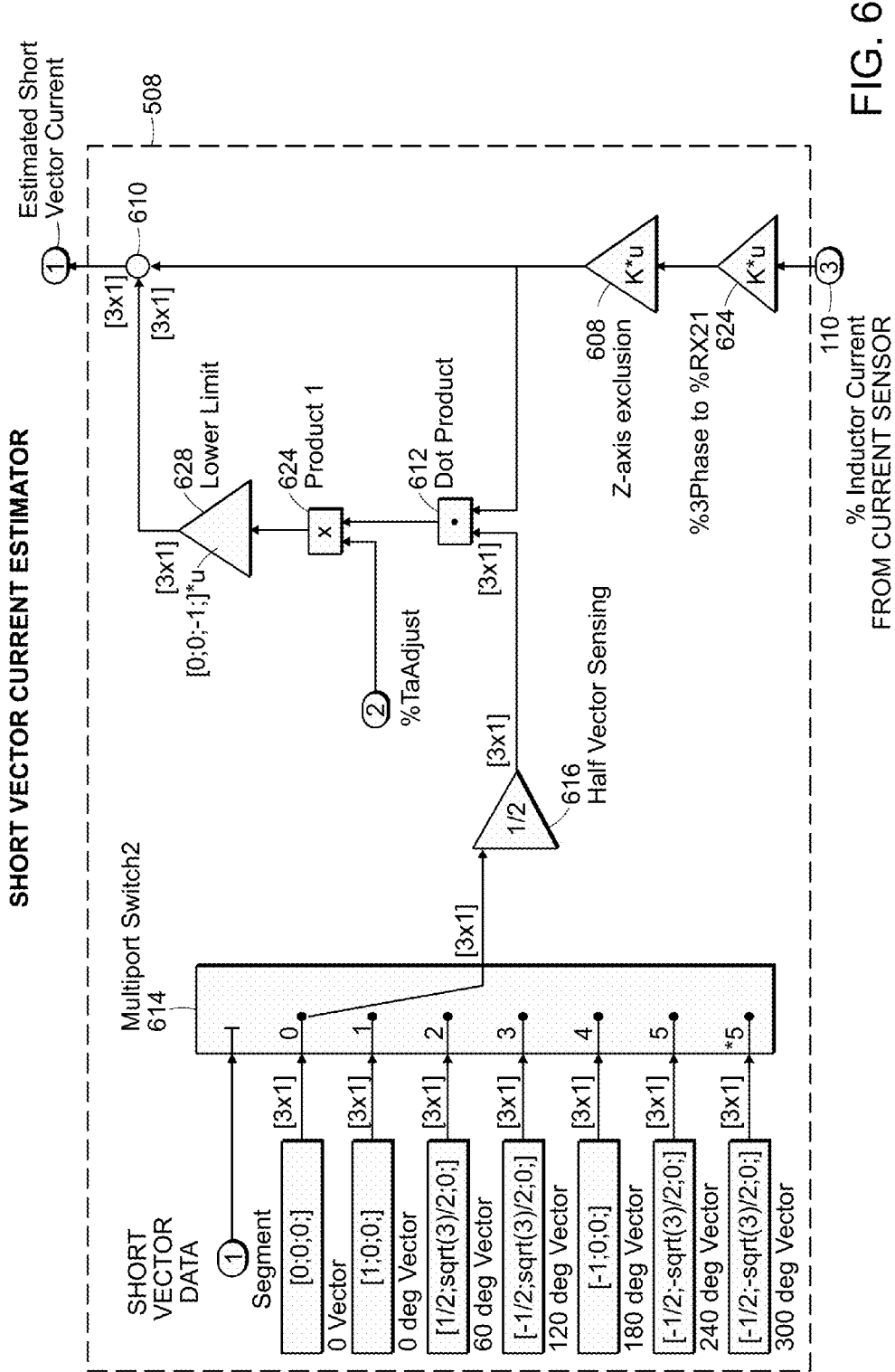
FIG. 6 is a functional block diagram of a portion of a short vector current estimator in accordance with an embodiment of the present invention.
Figure 7:
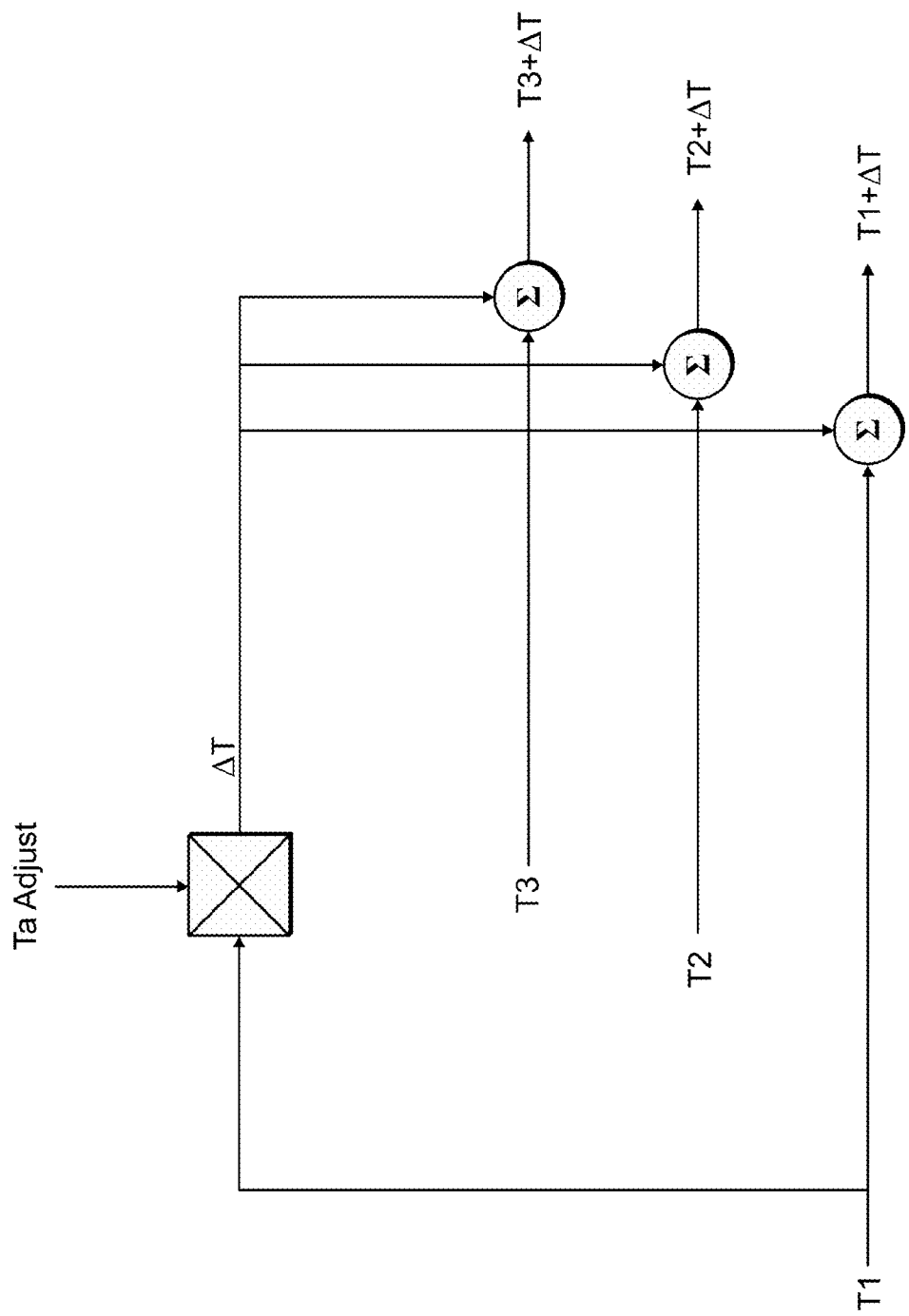
FIG. 7 is a functional block diagram of a portion of a short vector modulator in accordance with an embodiment of the present invention.

Referring now to FIGS. 5-7, a converter 500 in accordance with an embodiment of the present invention includes a controller 504, a converter module 104, an AC module 108 and a current sensor 110. The controller 504 includes a short vector current estimator module 508 coupled to the current sensor 110 and a space vector pulse width modulator (SVPWM) 512 coupled to the short vector current estimator module 508 and the converter module 104. A proportional-integrator (PI) current regulator 516 is coupled to the SVPWM 512.

Generally, as an overview of operation, the short vector current estimator 508 will convert the current measurements from the current sensor 110 into a vector form using a Clark/Park transform as is known to those skilled in the art. The estimator 508 will then zero out the zero sequence term to "free up" the z-axis component, i.e., make it available to be provided with a separately calculated value as described below. A current estimate is assigned to the unused Z-axis value that had previously been freed up to form a three axis representation of the currents of interest.

Further, in operation, a comparator 528 measures the voltages across the capacitors C1, C2 and provides a voltage error measurement signal to another comparator 532 receiving a Vcmd signal, nominally set to zero (0), that then feeds that difference value to a PI voltage regulator 524. The voltage regulator 524 responds to the difference signal from the comparator 532 and generates a capacitor current command that is presented, on the Z-axis, to a comparator 520 that is also receiving an estimated short vector a current signal measurement from the short vector current estimator module 508. A difference between the signals is provided to the PI current regulator 516. The current command set point established by the voltage regulator 524 should be equal to the parasitic currents that are giving rise to the voltage imbalance. The set point is established by the voltage regulator integral term.

An output of the comparator 520 (the error) is provided to the PI current regulator 516 which will generate a short vector duty cycle bias command (% Ta adjust) to the space vector modulator 512. The PI current regulator 516 will operate to adjust the balance (% Ta adjust) until the short vector current estimate matches the commanded current or the balance reaches 100% where all upper short vector or all lower short vector are being provided.

The space vector modulator 512 will accept the balance command from the current regulator 516 and adjust the pulse width modulation scheme ($\Delta T$) to shift the short vector balance to the set point thereby closing the inner current loop.

It is noted that the magnitude of the current being delivered to a particular capacitor is dominated by two major parameters: 1) the magnitude of the AC current circulating in the inverter; and 2) the percentage of the total space vector modulation period that is allocated to the short vectors. Advantageously, therefore, as the magnitude of the AC currents increase, the control authority of the present approach improves and, likewise, as the short vector period increases, the control authority also is improved.

As shown in FIG. 6, the short vector current estimator module 508 receives the three phases of AC current measurements from the current sensor 110 at a first filter 604 that converts the current measurements into an RXZ vector form using the Clark/Park transform as known in the art. The RXZ signal is then filtered by a filter 608 to remove the Z axis component of the signal, i.e., "freeing up" or "zeroing" the Z-axis value. The output of filter 608 is provided as an input to a summing junction 610 and a dot-product multiplier 612.

A multiplexer 614 is used to select segment data as a function of the short vector data from the space vector modulator 512 to synthesize a reference short vector (in 60° increments) that is then scaled by a scaler 616. The dot product between the current vector (from the filter 608) and the synthesized vector (the output of the scaler 612) is then generated. The resulting dot product is then scaled by % Ta adjust (multiplier 624) to yield a measure of the difference in current due to the weighting of the short vectors.

The resulting current estimate is then rotated and assigned (628) to the unused Z-axis value that had previously been freed up by the Z-axis exclusion block (608). The two current measurements are then summed (in summer 610) to form a three axis representation of the currents of interest. A positive feedback on the Z-axis will indicate current flowing into the upper capacitor and a negative current feedback on the Z-axis will indicate current being delivered to the lower capacitor.

The three space vector PWM transition thresholds, T1, T2 & T3 shown in FIG. 4 are first calculated by means known to those skilled in the art for a balanced short vector solution. As shown in FIG. 7, the lowest threshold T1 is subsequently used as the basis for the calculation of $\Delta T$. The balanced solution value of T1 is multiplied by the Ta Adjust signal, which is the output of the additional current regulator. The Ta Adjust signal has a range of +/−1 and therefore $\Delta T$ has a range of +/−T1. Subsequently $\Delta T$ is summed in with T1, T2 & T3 thereby shifting all three thresholds by an equal amount and preserving the displacements (long and medium vectors) between T1 and T2 and between T2 and T3. An additional feature of this instantiation is that T1 and T3 will never exceed the ramp shown in FIG. 4.

Figure 8:
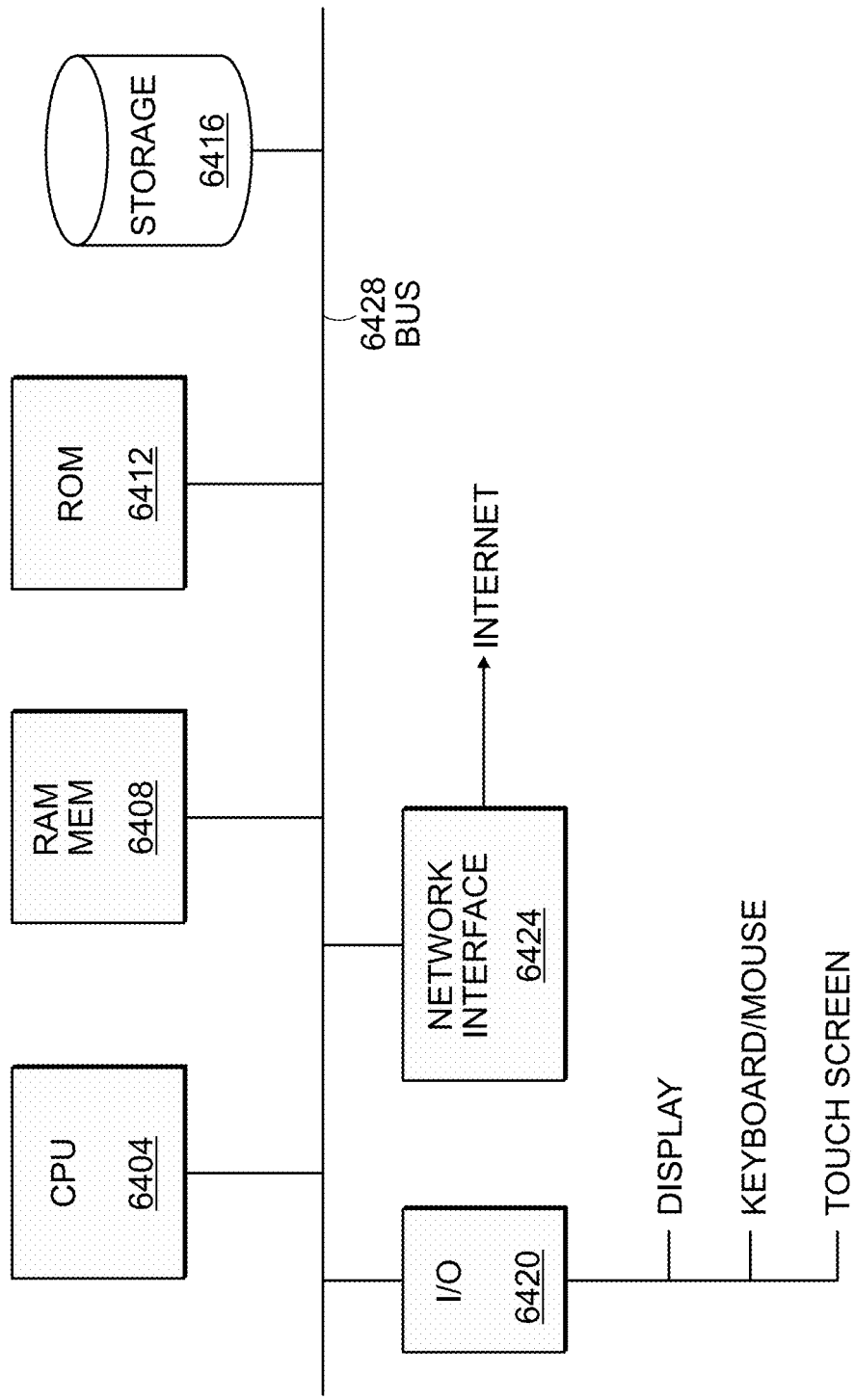
FIG. 8 is a functional block diagram of a system in accordance with one embodiment of the present invention.

Referring now to FIG. 8, embodiments of the present invention may be implemented with a controller 504 that may comprise a CPU 6404, RAM 6408, ROM 6412, a mass storage device 6416, for example, a disk drive, an I/O interface 6420 to couple to, for example, display, keyboard/mouse or touchscreen, or the like and a network interface module 6424 to connect to, either wirelessly or via a wired connection, to the Internet. All of these modules are in communication with each other through a bus 6428. The CPU 6404 executes an operating system to operate and communicate with these various components.

Various embodiments of the above-described systems and methods may be implemented in digital electronic circuitry, in computer hardware, firmware, and/or software. The implementation can be as a computer program product, i.e., a computer program embodied in a tangible information carrier. The implementation can, for example, be in a machine-readable storage device to control the operation of data processing apparatus. The implementation can, for example, be a programmable processor, a computer and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

While the above-described embodiments generally depict a system employing at least one processor executing program steps out of at least one memory to obtain the functions herein described, it should be recognized that the presently described methods may be implemented via the use of software, firmware or alternatively, implemented as a dedicated hardware solution such as in a field programmable gate array (FPGA) or an application specific integrated circuit (ASIC) or via any other custom hardware implementation either digital, analog or a hybrid of digital and analog components.

It is to be understood that the present invention has been described using non-limiting detailed descriptions of embodiments thereof that are provided by way of example only and are not intended to limit the scope of the invention. Features and/or steps described with respect to one embodiment may be used with other embodiments and not all embodiments of the invention have all of the features and/or steps shown in a particular figure or described with respect to one of the embodiments. Variations of embodiments described will occur to persons of skill in the art.

It should be noted that some of the above described embodiments include structure, acts or details of structures and acts that may not be essential to the invention and which are described as examples. Structure and/or acts described herein are replaceable by equivalents that perform the same function, even if the structure or acts are different, as known in the art, e.g., the use of multiple dedicated devices to carry out at least some of the functions described as being carried out by the processor of the present invention. Therefore, the scope of the invention is limited only by the elements and limitations as used in the claims.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

The present disclosure has been described herein with reference to particular means, materials and embodiments, but is not intended to be limited to the particulars disclosed herein; rather, the present disclosure extends to all functionally equivalent structures, methods and uses, such as are within the scope of the claims.

The invention claimed is:

1. A converter, comprising:
    a neutral point clamped (NPC) converter module comprising:
        a plurality of phase legs, each phase leg comprising a plurality of switches coupled in series with one another between a first node and a second node, each phase leg further comprising an AC node positioned between two adjacent switches;
    a current sensor coupled to each AC node and configured to measure an amount of current flowing into, or out of, each respective AC node; and
    a controller, coupled to the NPC converter module and the current sensor, configured to:
        generate a space vector pulse width modulated (SVPWM) signal to control a respective on/off condition of each of the plurality of switches as a function of:
            a short vector current signal generated as a function of a value of the current sensed at the respective AC nodes during short vector periods of the SVPWM signal; and
            a respective voltage differential between a first voltage on the first node and a second voltage on the second node, each with respect to a third node.

2. The converter of claim 1, wherein the controller is further configured to:
    adjust a modulation index signal as a function of the short vector current signal.

3. The converter of claim 1, wherein the controller further comprises:
    a proportional integrator (PI) current regulator configured to generate a voltage command signal as a function of the short vector current signal; and
    a space vector PWM modulator configured to receive the voltage command signal and generate the SVPWM signal as a function thereof.

4. The converter of claim 3, wherein the controller further comprises:
    a proportional integrator (PI) voltage regulator configured to output a current regulator command signal; and
    a difference module configured to output a difference value representing a difference between the short vector current signal and the current regulator command signal,
    wherein the PI current regulator is further configured to generate the voltage command signal as a function of the difference value.

5. The converter of claim 1, wherein the controller is further configured to generate each cycle of the SVPWM signal to start and end with a positive short vector portion and to include two negative short vector portions of equal duration in the middle of the cycle.

6. The converter of claim 5, wherein the controller is further configured to adjust a time duration of one or more of the positive and negative short vector portions of the SVPWM signal as a function of the short vector current signal.

7. A method of operating a multi-level neutral point clamped converter comprising:
    measuring AC current flowing in the converter;
    generating a short vector current signal representing a component of the measured AC current during a short vector period of a space vector pulse width modulated (SVPWM) driving signal;

measuring a voltage difference between respective voltages on each of two capacitors in a DC link portion of the converter; and modifying the SVPWM driving signal as a function of the generated short vector current signal and the measured voltage difference.

8. The method of claim 7, further comprising:

adjusting a modulation index signal as a function of the short vector current signal.

9. The method of claim 7, further comprising:

generating a current regulator command signal as a function of the short vector current signal; and and generating the SVPWM signal as a function of the current regulator command signal.

10. The method of claim 9, further comprising:

generating a difference value representing a difference between the short vector current signal and the current regulator command signal; and generating the voltage command signal as a function of the difference value.

11. The method of claim 7, further comprising generating each cycle of the SVPWM signal to start and end with a positive short vector portion and to include two negative short vector portions of equal duration in the middle of the cycle.

12. The method of claim 11, further comprising adjusting adjust a time duration of one or more of the positive and negative short vector portions of the SVPWM signal as a function of the short vector current signal.

13. A non-transitory computer readable media comprising instructions stored thereon that, when executed by a processing apparatus, cause the processing apparatus to implement a method of operating a multi-level neutral point clamped converter, the method comprising:

measuring AC current flowing in the converter;

generating a short vector current signal representing a component of the measured AC current during a short vector period of a space vector pulse width modulated (SVPWM) driving signal;

measuring a voltage difference between respective voltages on each of two capacitors in a DC link portion of the converter; and modifying the SVPWM driving signal as a function of the generated short vector current signal and the measured voltage difference.

14. The computer readable media of claim 13, the method further comprising:

adjusting a modulation index signal as a function of the short vector current signal.

15. The computer readable media of claim 13, the method further comprising:

generating a current regulator command signal as a function of the short vector current signal; and and generating the SVPWM signal as a function of the current regulator command signal.

16. The computer readable media of claim 15, the method further comprising:

generating a difference value representing a difference between the short vector current signal and the current regulator command signal; and generating the voltage command signal as a function of the difference value.

17. The computer readable media of claim 13, the method further comprising generating each cycle of the SVPWM signal to start and end with a positive short vector portion and to include two negative short vector portions of equal duration in the middle of the cycle.

18. The computer readable media of claim 17, the method further comprising adjusting adjust a time duration of one or more of the positive and negative short vector portions of the SVPWM signal as a function of the short vector current signal.

* * * * *